United States Patent [19]
Weller

[11] Patent Number: 6,123,393
[45] Date of Patent: Sep. 26, 2000

[54] BELT RETRACTOR FOR INCORPORATING IN A FOLD-DOWN TYPE BACKREST

[75] Inventor: Hermann-Karl Weller, Alfdorf, Germany

[73] Assignee: TRW Occupant Restraint Systems GmbH & Co. KG, Alfdorf, Germany

[21] Appl. No.: 09/196,017

[22] Filed: Nov. 19, 1998

[30] Foreign Application Priority Data

Nov. 24, 1997 [DE] Germany ..................... 297 20 816 U

[51] Int. Cl.⁷ .................................................. B60R 21/00
[52] U.S. Cl. .......................................... 297/478; 297/480
[58] Field of Search ..................... 297/478, 476, 297/475, 474, 480, 378.1, 378.12, 378.13, 378.11; 280/806, 807, 808; 242/383.2, 383.4, 383.5, 384

[56] References Cited

U.S. PATENT DOCUMENTS 3,918,658  11/1975  Beller .
5,495,994  3/1996  Rumpf et al. .

FOREIGN PATENT DOCUMENTS 2927159  2/1981  Germany ................. 297/475

*Primary Examiner*—Milton Nelson, Jr.
*Attorney, Agent, or Firm*—Tarolli, Sundheim, Covell, Tummino & Szabo L.L.P.

[57] ABSTRACT

A belt retractor for incorporation in a fold-down type backrest of a vehicle seat is disclosed. The backrest of the seat is able of being latched to a vehicle body in an upright seating position by a lock. The retractor has a frame and a belt reel rotatably mounted in the frame. A blocking mechanism is provided for selectively blocking rotation of the belt reel on the frame. The blocking mechanism is activated as long as the backrest is not locked in place by latching action of the lock. The blocking mechanism comprises an activating mechanism and an actuating element associated therewith and coupled to the lock by a push/pull mechanism.

7 Claims, 3 Drawing Sheets

000000
BELT RETRACTOR FOR INCORPORATING IN A FOLD-DOWN TYPE BACKREST

BACKGROUND OF THE INVENTION

The invention relates to a belt retractor for incorporating in a fold-down type backrest which can be latched to the vehicle body in the upright seating position by a lock, including a belt reel rotatably mounted in a frame and a blocking mechanism for selectively blocking rotation of the belt reel on the frame.

When the belt retractor is not secured directly to the vehicle body but to a backrest the belt forces are introduced into the vehicle body via the backrest and its anchorage. A fold-down type backrest needs to be latched to the vehicle body so that it can take the belt forces and transfer them into the vehicle body. Latching a fold-down type backrest to the vehicle body is done by means of a lock which automatically locks in place on attaining the upright seating position of the backrest.

SUMMARY OF THE INVENTION

Since the seat belt is unable to satisfy its restraint function when the lock has failed to fully latch in place the invention proposes activating the blocking mechanism of the belt retractor as long as the backrest is not locked in place by latching action of the lock. When the blocking mechanism is activated, no belt webbing can be withdrawn from the belt retractor. The seat belt can thus not be fastened as long as the backrest is not latched to the vehicle body, thus making it impossible for the seat belt to be fastened without it providing its restraint capability.

Advantageously the blocking mechanism features an activating means and an actuating element assigned to the latter, this actuating element being coupled to the lock by a push/pull means. The actuating element is coupled to the lock in such a way that when the lock is locked in place the actuating element does not activate the control means and thus the blocking mechanism, whereas when the lock is not locked in place the actuating element causes activation of the blocking mechanism. By using an activating means, the forces needing to be developed by the actuating element can be maintained low. Push/pull means between the lock and the actuating element permit variable positioning of the belt retractor in the backrest.

In a further development of the invention, the blocking mechanism comprises ratchet teeth arranged on the belt reel, at least one ratchet pawl which can be caused to engage the ratchet teeth, a control lever for bringing the ratchet pawl into engagement with the ratchet teeth, a coupling disk connected to the belt reel, the coupling disc having a toothing, a backrest lock pawl arranged on the control lever, whereby the backrest lock pawl can be brought into engagement with the toothing of the coupling disk, and an actuating finger coupled to the lock by a cable pull and acting on the backrest lock pawl. The arrangement of a backrest lock pawl on the control lever and the actuation thereof by an actuating finger is especially of advantage when, for instance, direct coupling of the ratchet pawl to the lock is not possible due to an excessively high actuating force, and when activating the blocking mechanism via vehicle-sensitive activating means is not possible for lack of space. By relatively simple means a further functional feature of the belt retractor can be realized by an additional backrest lock pawl.

A further development also consists of furthermore providing on the control lever an intermediate pawl which can be brought into engagement with the toothing of the coupling disk in a vehicle-sensitive manner. A separate intermediate pawl facilitates arranging the vehicle-sensitive sensor and the configuration thereof. In addition, the intermediate pawl can be actuated by a tracking sensor or a sensor responding to two vehicle directions. Accordingly, a child restraint pin may be provided which causes the intermediate pawl to engage the toothing of the coupling disk.

In yet a further development, a compression spring is provided by which the actuating finger is biased towards the position in which it releases the backrest lock pawl for engaging the toothing of the coupling disk. As a result of this, the blocking mechanism is even activated in case the cable pull connecting the actuating finger breaks. Breakage of the cable pull then prohibits further withdrawal of belt webbing.

It is likewise of advantage when the cable pull is provided with a sleeve, the end part of which provided for connection to the frame of the belt retractor mounts the compression spring and a stop of the actuating finger cooperating with the compression spring. Such a measure permits a complete preassembly of the belt retractor and subsequent connection of the cable pull to the completely assembled unit.

It is furthermore of advantage that the actuating finger is guided in a longitudinal bore of a sensor plate secured to the frame, thus ensuring reliable guidance of the actuating finger without the need of additional components.

It is likewise provided for that the coupling disk comprises a further toothing and the backrest lock pawl comprises a first and a second control knuckle, the first control knuckle permitting engagement with the one toothing on rotation of the belt reel in the unwinding direction of the belt webbing and the second control knuckle on rotation of the belt reel in the winding direction. Due to this arrangement, winding of the belt webbing is also prevented during folding action of the backrest.

Finally, it is of advantage that the toothing and the further toothing are axially offset from each other on the coupling disk, this measure avoiding a mutual obstruction of the first control knuckle and the further toothing and, respectively, of the second control knuckle and the toothing.

BRIEF DESCRIPTION OF THE DRAWINGS

Further features and advantages of the invention are apparent from the following description of the preferred embodiment of the invention and from the drawing to which reference is made and in which.

DESCRIPTION OF SPECIFIC EMBODIMENT

Figure 1:
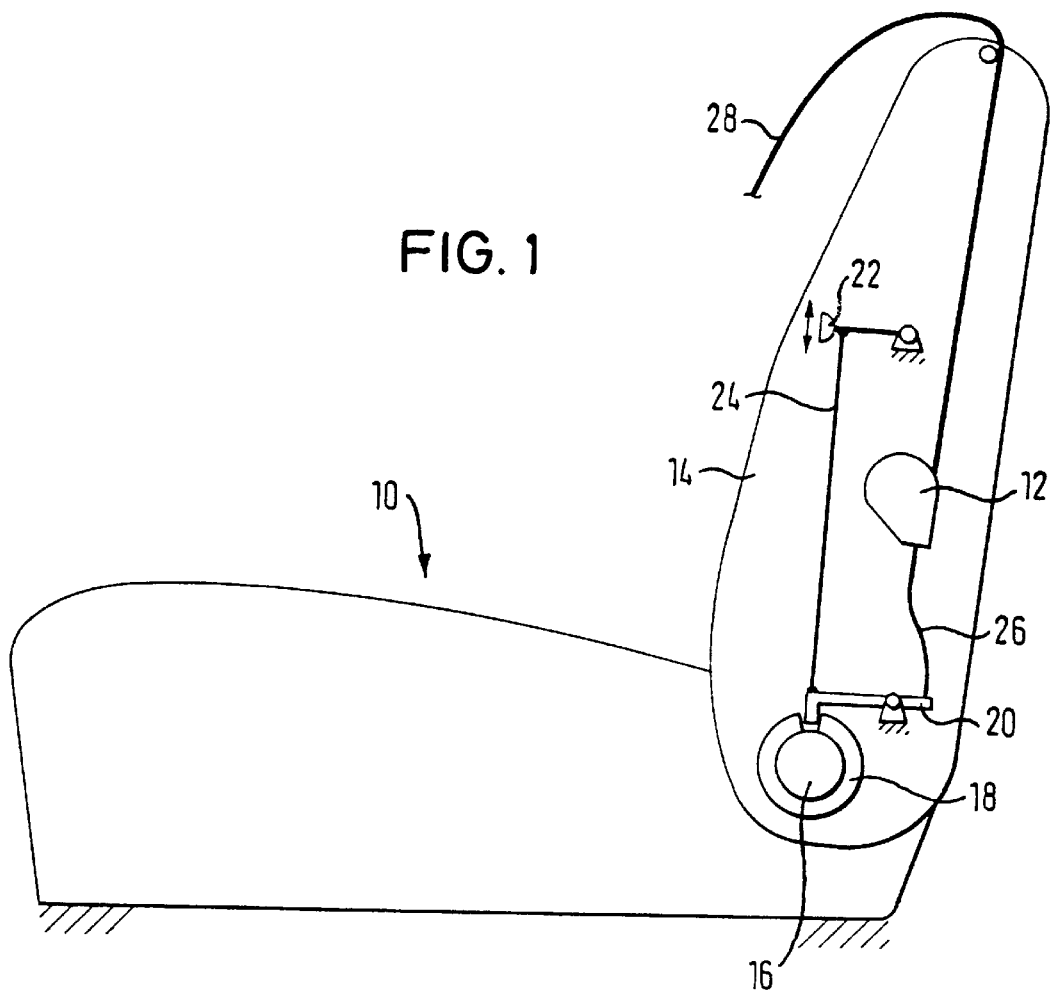
FIG. 1 is a schematic illustration of a vehicle seat with a belt retractor in accordance with the invention.

The schematic illustration as shown in FIG. 1 shows a vehicle seat 10 with a belt retractor 12 in accordance with the invention. The belt retractor 12 is arranged in the backrest 14 of the vehicle seat 10, which backrest is connected by a rotary joint 16 to the seat part and thus to the vehicle body. The backrest 14 can be hinged about the rotary joint 16 and is locked in place in its upright seating position as shown in FIG. 1 by a lock. The lock is indicated schematically by a disk 18 arranged concentrically about the rotary joint 16 and fixedly connected to the seat part, and by a moving function part, i.e. a latch bolt 20. The disk 18 comprises a recess which is engaged by the latch bolt 20 swivably mounted in the backrest 14. The backrest 14 can be released and subsequently folded down by the latch bolt 20 being moved out of the recess in the disk 18. This is done by a latch release lever 22 connected with the latch bolt via a cable pull 24. The latch bolt 20 is configured as a double-ended lever, the one end of which is engaged by the cable pull 24 and the other end of which is engaged by a cable pull 26 which is in connection with the belt retractor 12. When the latch bolt 20 is moved out of the recess in the disk 18 by an upward movement of the latch release lever 22, the blocking mechanism of the belt retractor 12 is activated at the same time by the cable pull 26. When the latch bolt 20 is not engaging the recess in the disk 18, no belt webbing 28 can thus be withdrawn from the belt retractor 12.

Figure 4:
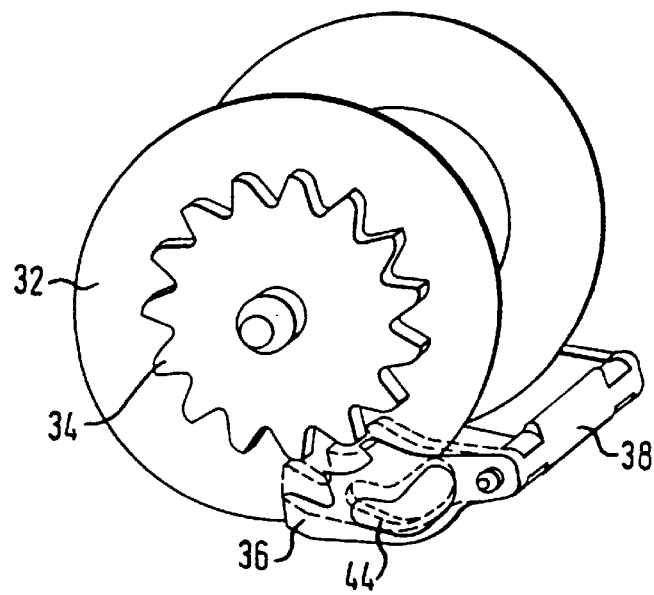
FIG. 4 is a perspective side view of parts of the belt retractor for illustrating the function.
Figure 2:
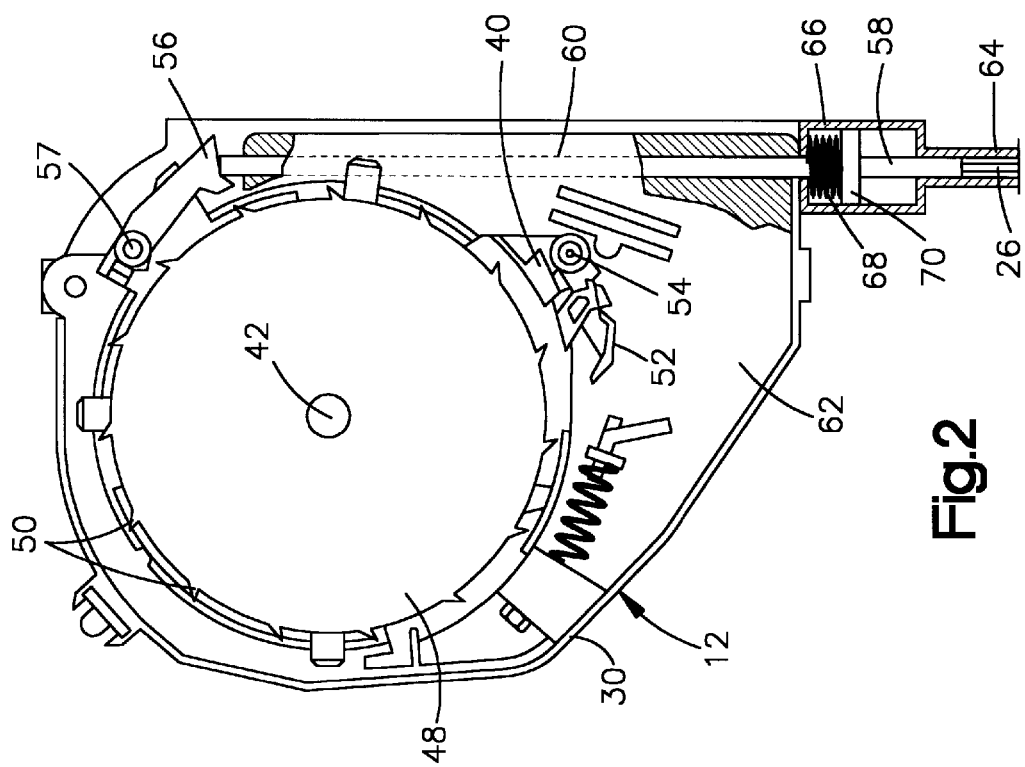
FIG. 2 is a side view of a first embodiment of the belt retractor in accordance with the invention in a partially sectioned view with the backrest locked in place.

The side view as shown in FIG. 2 illustrates the belt retractor 12 in detail, whereby for better illustration a side cover hood has been removed and the belt retractor 12 is depicted in a partially sectioned view. The belt retractor 12 comprises a frame 30 in which a belt reel 32, as shown in FIG. 4, is rotatably mounted. The belt reel 32 comprises at each of its side flanges ratchet teeth 34 which can be each engaged by a ratchet pawl 36. As is evident from FIG. 4 the ratchet pawls 36 are connected to each other by a web 38 and they are swivably mounted at the frame 30 of the belt retractor 12. To bring the ratchet pawls 36 into engagement with the ratchet teeth 34, a control lever 40 is provided which is mounted rotatably about the axle 42 of the belt reel 32. When the control lever 40 is rotated counter-clockwise as shown in FIG. 2, a protuberance on the control lever 40 engages the recess 44 in the ratchet pawl 36 and brings the latter into engagement with the ratchet teeth 34. This rotary movement of the control lever 40 is in turn caused by a coupling disk 48 connected non-rotatably to the belt reel 32. This coupling disk comprises on its outer circumference a toothing 50 with which an intermediate pawl 52 swivably mounted on the control lever 40 can be caused to engage, this intermediate pawl being mounted via a rotary joint 54 on the control lever 40. The intermediate pawl 52 is actuated by a conventional ball sensor (not shown). As soon as the vehicle acceleration exceeds a predetermined value the ball sensor pushes the intermediate pawl 52 as shown in FIG. 2 upwards, as a result of which the intermediate pawl engages the toothing 50. If at the same time the belt reel 32 is rotated counter-clockwise and thus the coupling disk 48, as shown in FIG. 2, the control lever 40 likewise performs a rotary movement counter-clockwise, as a result of which the ratchet pawls 36 are caused to engage the ratchet teeth 34 thus blocking the belt reel. Blocking the belt reel may be activated by a conventional webbing-sensitive activating means which is not shown in the Figures.

A rotary movement of the control lever 40, resulting in the belt retractor 12 being blocked, can be likewise caused by a backrest lock pawl 56 which is likewise swivably mounted on the control lever 40 via a rotary joint 57. In the condition as shown in FIG. 2 with the backrest locked in place the backrest lock pawl 56 is held by an actuating finger 58 so that the backrest lock pawl 56 is unable to engage the toothing of the coupling disk 48. The actuating finger 58 is mounted longitudinally shiftable in a longitudinal bore 60 of a sensor plate 62. The sensor plate 62 is in turn fixedly secured to the frame 30 of the belt retractor 12. The actuating finger 58 is arranged at the end of the push/pull cable 26 which is in connection with the latch bolt 20 as shown in FIG. 1. The cable pull 26 features a sleeve 64 which is in turn provided with an end part 66 secured to the frame 30. Arranged within the end part 66 is a compression spring 68 which cooperates with a stop 70 of the actuating finger 58 biasing it towards the position in which the actuating finger 58 releases the backrest lock pawl 56 and thus causes the belt retractor 12 to be blocked.

Figure 3:
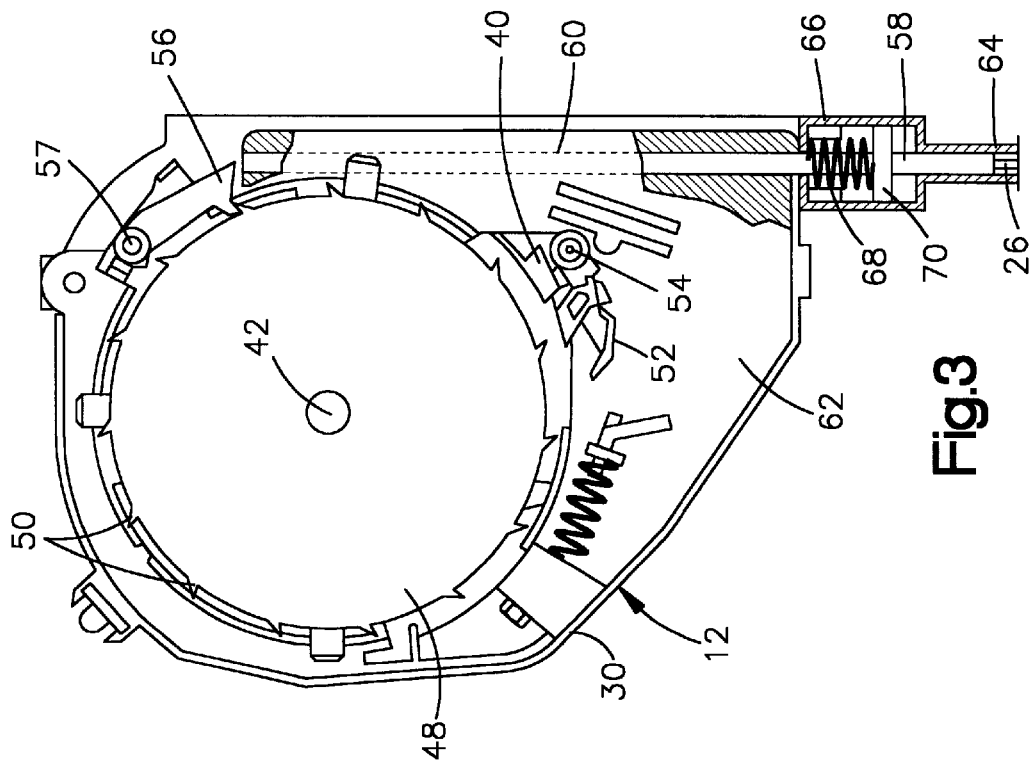
FIG. 3 illustrates the belt retractor as shown in FIG. 2 with the backrest not locked in place.

Such a condition can be seen in FIG. 3. The actuating finger 58 has been moved downwards by a movement of the unlatching lever 22 via the push/pull cable 26 so that its upper end releases the backrest lock pawl 56. The position of the actuating finger 58 as shown in FIG. 3 can be likewise attained by the action of the compression spring 68 in case the cable pull 26 breaks. The released backrest lock pawl 56 swivels by its own weight clockwise thus engaging the toothing 50 of the coupling disk 48, resulting in rotation of the control lever 40 and thus blocking the belt retractor 12 via the ratchet pawls 36 and ratchet teeth 34 as shown in FIG. 4. When the backrest lock is unlatched no belt webbing can thus be withdrawn, whereas once the backrest has been moved back into its upright seating position the backrest lock is able to lock into place and the actuating finger 58 is shifted by the cable pull 26 into its upper position as shown in FIG. 2. In this action the relatively small force of the compression spring 68 needs to be overcome. With that, the backrest lock pawl 56 again releases the toothing 50 and belt webbing can again be withdrawn from the belt retractor 12. In this position of the actuating finger 58 and the backrest lock pawl 56 as shown in FIG. 2, blocking the belt reel 32 via bringing the ratchet pawls 36 into engagement can only be caused by the vehicle-sensitive and webbing-sensitive activating system.

Figure 5:
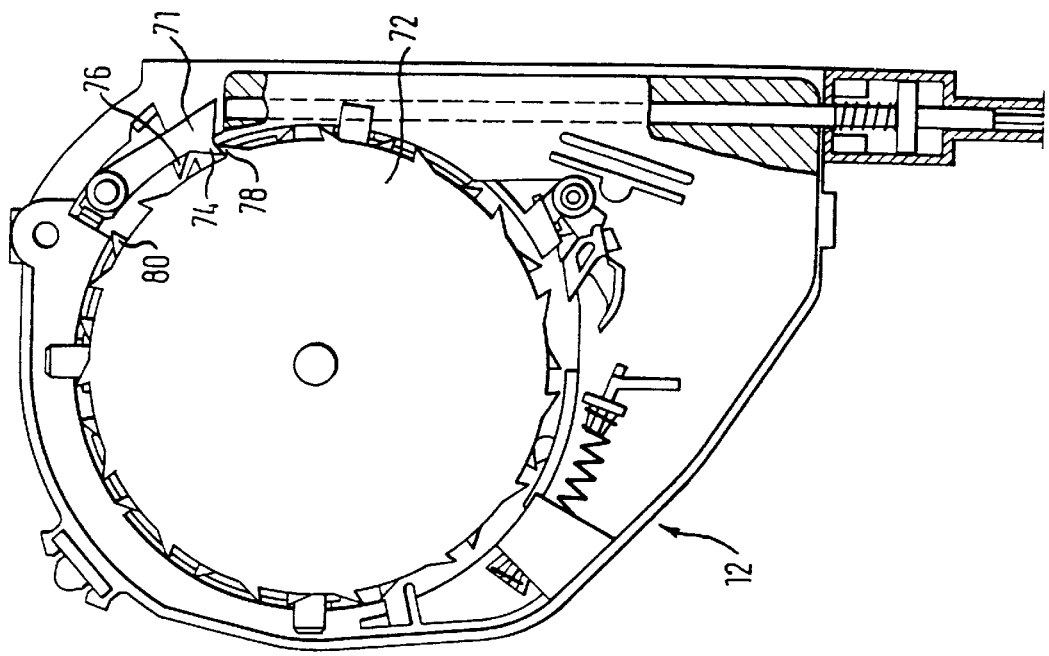
FIG. 5 is a side view of a further embodiment of the belt retractor in accordance with the invention in a partially sectioned view with the backrest locked in place and FIG. 6 illustrates the belt retractor as shown in FIG. 5 with the backrest not locked in place.
Figure 6:
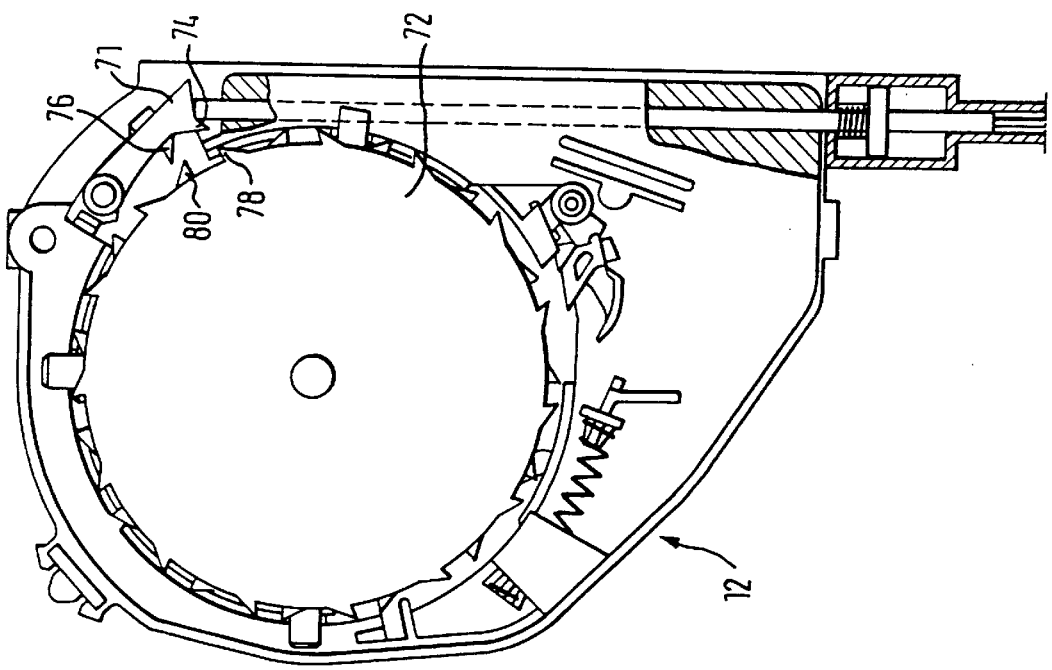

The second embodiment of the belt retractor 12 in accordance with the invention, as shown in FIG. 5 and FIG. 6, is configured essentially the same as the belt retractor shown in FIGS. 2 and 3. Here, however, to additionally prevent winding of the belt webbing when the backrest is unlatched, a backrest lock pawl 71 and a coupling disk 72 differing to those of the first embodiment are provided. The backrest lock pawl 71 is provided with a first control knuckle 74 and a second control knuckle 76, and the coupling disk 72 comprises a first toothing 78 and a second toothing 80. In this arrangement, the first toothing 78 is configured the same as the toothing 50 shown in FIGS. 2 and 3 so that on rotation of the belt reel in the unwinding direction, the first control knuckle 74 can be caused to engage the first toothing, as a result of which this rotation is blocked. On rotation of the belt reel in the winding direction, the second control knuckle 76 can be caused to engage the second toothing 80, as a result of which that rotation is blocked. In this arrangement the toothings 78 and 80, as well as the control knuckles 74 and 76 are axially offset relative to each other, i.e. in the direction of the belt reel axis. In this way, when the first control knuckle 74 and the second control knuckle 76 are brought into engagement with the first toothing 78 and second toothing 80, respectively, no obstruction can occur by the respective other toothing or control knuckle.

As shown in FIG. 6 the backrest of the vehicle seat is unlatched and the first control knuckle 74 of the backrest lock pawl 71 is in engagement with the first toothing 78 of the coupling disk 72, so that no belt webbing can be withdrawn from the belt reel any more. In addition, also in the winding direction, the belt reel is able to rotate only by a small angular amount since on such a rotation, clockwise as shown in FIG. 6, the second control knuckle 76 engages the second toothing 80, thus also preventing winding of the belt webbing.

I claim:

1. A belt retractor for incorporation in a fold-down type backrest of a vehicle seat, which can be latched to a vehicle body in an upright seating position by a lock, said retractor including a frame, a belt reel rotatably mounted in said frame, and a blocking mechanism coupled to said belt reel for selectively blocking rotation of said belt reel on said frame, said blocking mechanism being activated as long as the backrest is not locked in place by latching action of the lock, said blocking mechanism comprising an activating means and an actuating element associated therewith and coupled to the lock by a push and pull means, said blocking mechanism further comprising ratchet teeth arranged on said belt reel, at least one ratchet pawl which can be caused to engage said ratchet teeth, a control lever for bringing said ratchet pawl into engagement with said ratchet teeth, a coupling disk connected to said belt reel, said coupling disk having a control toothing, a backrest lock pawl arranged on said control lever, whereby said backrest lock pawl can be brought into engagement with said control toothing of said coupling disk, and an actuating finger coupled to the lock by a cable and acting on said backrest lock pawl.

2. The belt retractor as set forth in claim 1, wherein said coupling disk comprises a further toothing and said backrest lock pawl comprises a first control knuckle and a second control knuckle, wherein said first control knuckle can be brought into engagement with the control toothing in the belt unwinding direction and said second control knuckle can be brought into engagement with said further toothing in the belt winding direction.

3. The belt retractor as set forth in claim 2, wherein said control toothing and said further toothing are axially offset relative to each other on said coupling disk.

4. The belt retractor as set forth in claim 1, wherein an intermediate pawl is furthermore provided on said control lever, which intermediate pawl can be brought into engagement with said control toothing of said coupling disk in response to inertial forces.

5. The belt retractor as set forth in claim 1, wherein a compression spring is provided by which said actuating finger is biased towards a position in which it releases said backrest lock pawl for engaging said control toothing of said coupling disk.

6. The belt retractor as set forth in claim 5, wherein said cable is provided with a sleeve, said sleeve having an end part provided for connection to said frame of said belt retractor and for mounting said compression spring, and said actuating finger having a stop cooperating with said compression spring.

7. The belt retractor as set forth in claim 1, wherein said actuating finger is guided in a longitudinal bore of a sensor plate secured to said frame.

* * * * *